United States Patent
Aleksy

(10) Patent No.: US 11,844,149 B2
(45) Date of Patent: Dec. 12, 2023

(54) SENSOR SYSTEM

(71) Applicant: ABB Schweiz AG, Baden (CH)

(72) Inventor: Markus Aleksy, Ludwigshafen (DE)

(73) Assignee: ABB Schweiz AG, Baden (CH)

( * ) Notice: Subject to any disclaimer, the term of this patent is extended or adjusted under 35 U.S.C. 154(b) by 284 days.

(21) Appl. No.: 17/372,577

(22) Filed: Jul. 12, 2021

(65) Prior Publication Data
US 2022/0022283 A1    Jan. 20, 2022

(30) Foreign Application Priority Data

Jul. 20, 2020 (EP) .................................. 20186768

(51) Int. Cl.
*H04W 84/20* (2009.01)
*H04W 4/38* (2018.01)
*H04W 4/80* (2018.01)
*G05B 19/418* (2006.01)

(52) U.S. Cl.
CPC ...... *H04W 84/20* (2013.01); *G05B 19/41855* (2013.01); *G05B 19/41865* (2013.01); *H04W 4/38* (2018.02); *H04W 4/80* (2018.02); *G05B 2219/23297* (2013.01); *G05B 2219/25186* (2013.01)

(58) Field of Classification Search
CPC ... H04W 84/20; H04W 4/80; H04W 52/0235; H04W 52/0203; H04W 4/008; G05B 19/41865; H04N 13/204
See application file for complete search history.

(56) References Cited

U.S. PATENT DOCUMENTS

| 2017/0195821 | A1* | 7/2017 | Lam ........................ H04W 4/70 |
| 2017/0289255 | A1 | 10/2017 | Urquhart et al. |
| 2018/0132183 | A1 | 5/2018 | Gattu |
| 2018/0309919 | A1* | 10/2018 | Naing .................. H04N 25/745 |
| 2019/0041830 | A1* | 2/2019 | Yarvis ................. G06F 11/2023 |

FOREIGN PATENT DOCUMENTS

EP   2660667 A2   11/2013

OTHER PUBLICATIONS

P.T. Eugster et al., "The Many Faces of Publish/Subscribe,"ACM Computing Surveys, Jun. 2003, pp. 114-131, Association for Computer Machinery, New York, NY, United States.

(Continued)

*Primary Examiner* — Iqbal Zaidi
(74) *Attorney, Agent, or Firm* — Leydig, Voit & Mayer, Ltd.

(57) ABSTRACT

A sensor system includes: one or more master sensors; a plurality of slave sensors; and one or more servers. The one or more master sensors wirelessly send data to the plurality of slave sensors. The plurality of slave sensors acquire environmental and/or industrial process data based on associated configurations of the plurality of slave sensors. The plurality of slave sensors wirelessly send the environmental and/or industrial process data to the one or more master sensors. The one or more master sensors send the environmental and/or industrial process data to at least one of the one or more servers over a wireless network.

21 Claims, 1 Drawing Sheet

(56) References Cited

OTHER PUBLICATIONS

Gamma, E et al., "Design Patterns, Elements of Reusable, Object-Oriented Software," 1995, Abstract, Addison-Wesley, Boston, MA, United States Retrieved from the Internet:< URL: https://www.amazon.de/Patterns-Elements-Reusable-Object-Oriented-Software/dp/0201633612).
Pärssinen, J. et al., "Pattern Language for Service Discovery," Proceedings of 9th European Conference on Pattern Languages of Programs, Dec. 2004, pp. 1-16, EuroPLoP 2004, Irsee, Germany.
Jain, P. et al, "Leasing," Proceedings of 7th Patterns Languages of Programs Conference, pp. 1-26, Aug. 2000, PLoP 2000, Allerton Park, Monticello, Illinois, United States.

\* cited by examiner

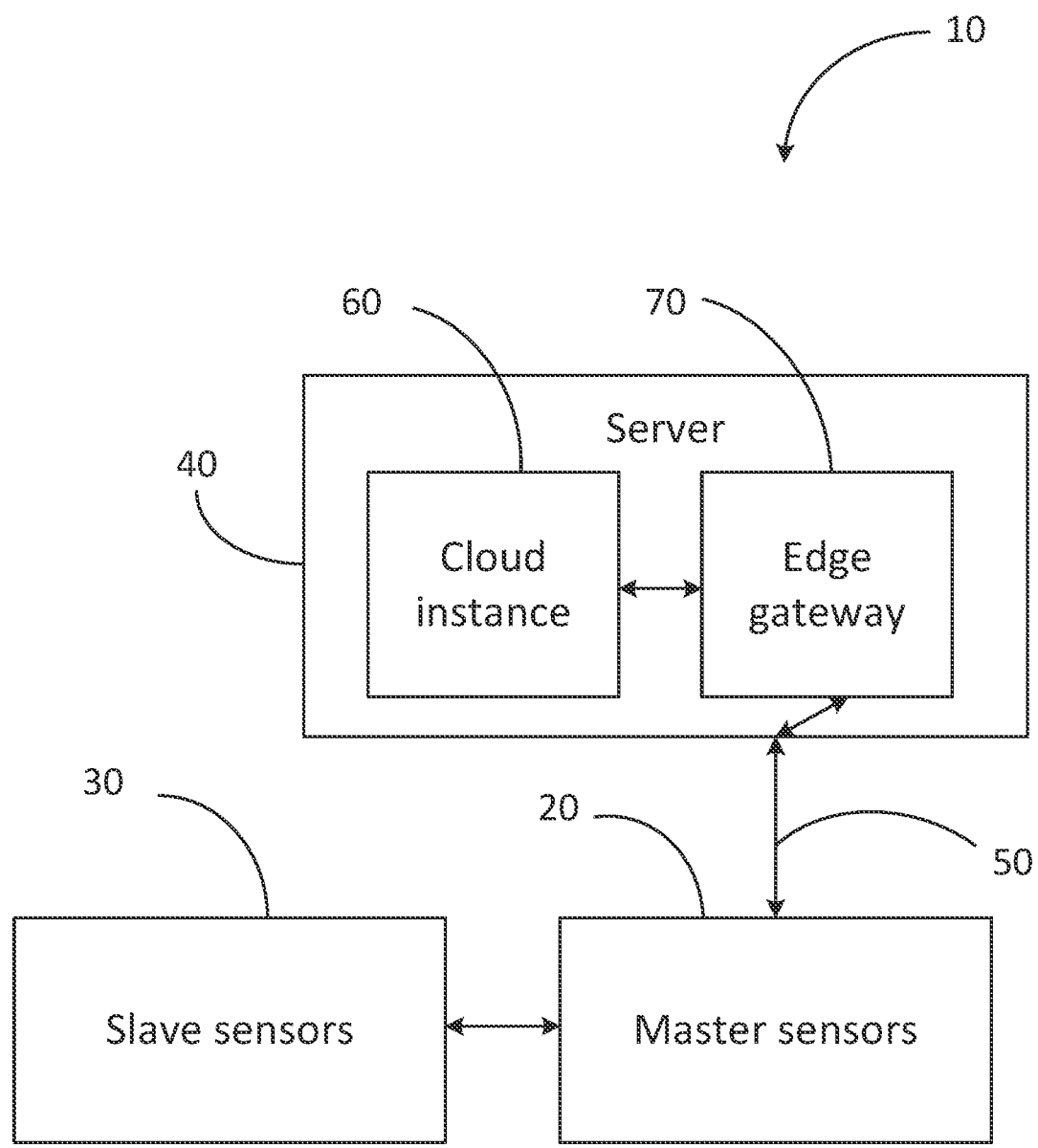

SENSOR SYSTEM

CROSS-REFERENCE TO PRIOR APPLICATION

Priority is claimed to European Patent Application No. EP 20 186 768.6, filed on Jul. 20, 2020, the entire disclosure of which is hereby incorporated by reference herein.

FIELD

The present invention relates to a sensor system, a sensing method with a sensing system, one or more computer programs, a non-transitory computer storage medium, a download product, one or more computers with the one or more computer programs, one or more computers with the non-transitory computer storage medium, and one or more computers with the download product.

BACKGROUND

Industrial plants are fitted with numerous field devices with associated sensors and/or with standalone sensors. Nowadays, industrial sensors are quite heterogeneous. Therefore, each sensor type/sensor product group often requires the usage of a specific communication technology or even a product-specific communication gateway. This increases the corresponding integration effort or even makes such integration impossible. Moreover, the information and communications technology (ICT) infrastructure is continuously undertaking major changes that further exacerbates the integration problem.

There is a need to address these issues.

SUMMARY

In an embodiment, the present invention provides a sensor system, comprising: one or more master sensors; a plurality of slave sensors; and one or more servers, wherein the one or more master sensors are configured to wirelessly send data to the plurality of slave sensors, wherein the plurality of slave sensors are configured to acquire environmental and/or industrial process data based on associated configurations of the plurality of slave sensors, wherein the plurality of slave sensors are configured to wirelessly send the environmental and/or industrial process data to the one or more master sensors, and wherein the one or more master sensors are configured to send the environmental and/or industrial process data to at least one of the one or more servers over a wireless network.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows a schematic representation of a sensor system.

DETAILED DESCRIPTION

In an embodiment, the present invention provides an improved sensor system for industrial environments and/or plants and/or processes.

In a first aspect, there is provided a sensor system, comprising:
one or more master sensors (20);
a plurality of slave sensors (30); and
one or more servers (40);

The one or more master sensors are configured to wirelessly send data to the plurality of slave sensors. The plurality of slave sensors are configured to acquire environmental and/or industrial process data based on associated configurations of the plurality of slave sensors. The plurality of slave sensors are configured to wirelessly send the environmental and/or industrial process data to the one or more master sensors. The one or more master sensors are configured to send the environmental and/or industrial process data to at least one of the one or more servers over a wireless network.

In an example, the plurality of slave sensors are configured to wirelessly send the environmental data and/or industrial process data to the one or more master sensors based on the associated configurations of the plurality of slave sensors.

In an example, the one or more servers comprises one or more cloud instances configured to store the environmental and/or industrial process data.

In an example, the one or more servers comprises one or more edge gateways.

In an example, the one or more edge gateways are configured to receive the environmental data and/or industrial process data. The one or more edge gateways are configured to pre-process the environmental data and/or preprocess the industrial process data. The one or more edge gateways are configured to send the pre-processed environmental data and/or the pre-processed industrial process data to the one or more cloud instances for storage.

In an example, the one or more master sensors are configured to register the plurality of slave sensors prior to receiving the environmental data from the plurality of slave sensors and/or prior to receiving the industrial process data from the plurality of slave sensors.

In an example, the registration is based on information transmitted from the one or more cloud instances.

In an example, the one or more edge gateways are configured to register the one or more master sensors prior to receiving the environmental data from the one or more master sensors and/or prior to receiving the industrial process data from the one or more master sensors.

In an example, the registration is based on information transmitted from the one or more cloud instances.

In an example, the wireless network comprises a cellular or mobile network.

In an example, the wireless network comprises a LTE and/or 5G network.

In an example, the plurality of slave sensors and the one or more master sensors are configured to communicate with each other utilizing one or more of Wi-Fi, Bluetooth, BLE, VLC, infrared radiation.

In an example, the one or more master sensors are configured to register a slave sensor prior to receiving the environmental data and/or industrial process data from that slave sensor.

In an example, a master sensor is configured to reconfigure a slave sensor based on the environmental data and/or industrial process data received from that slave sensor.

In an example, the one or more master sensors and/or one or more of the plurality of slave sensors are configured to temporarily store the environmental data and/or industrial process data.

In an example, the one or more master sensors and/or one or more of the plurality of slave sensors are configured to pre-process the environmental data and/or are configured to pre-process the industrial process data.

In an example, the plurality of slave sensors are configured to indicate to the one or more master sensors their associated temporal availability based on the associated configurations of the plurality of slave sensors and/or are configured to indicate to the one or more master sensors their associated temporal unavailability based on the associated configurations of the plurality of slave sensors.

In a second aspect, there is provided a sensing method with a sensor system. The sensor system comprises: one or more master sensors; a plurality of slave sensors; and one or more servers. The method comprises:

wirelessly sending data from the one or more master sensors to the plurality of slave sensors;

acquiring environmental and/or industrial process data by the plurality of slave sensors based on associated configurations of the plurality of slave sensors;

wirelessly sending the environmental and/or industrial process data from the plurality of slave sensors to the one or more master sensors; and sending the environmental and/or industrial process data from the one or more master sensor to at least one of the one or more servers over a wireless network.

In a third aspect, there is provided one or more computer programs, comprising machine-readable instructions that, when executed on one or more computers, cause the one or more computers to perform the method according to the second aspect.

In a fourth aspect, there is provided a non-transitory computer storage medium, and/or a download product, with the one or more computer programs according to the third aspect.

In a fifth aspect, there is provided one or more computers with the one or more computer programs according to the third aspect.

In a sixth aspect, there is provided one or more computers with the non-transitory computer storage medium and/or the download product according to the fourth aspect.

The above aspects and examples will become apparent from and be elucidated with reference to the embodiments described hereinafter.

FIG. 1 relates to a sensor system for industrial environments and/or plants and/or processes 10.

In an example, the sensor system 10 comprises one or more master sensors 20, a plurality of slave sensors 30, and one or more servers 40. The one or more master sensors are configured to wirelessly send data to the plurality of slave sensors. The plurality of slave sensors are configured to acquire environmental data. Additionally or alternatively the plurality of slave sensors are configured to acquire industrial process data. The manner in which the plurality of slave sensors acquire this data is based on associated configurations of the plurality of slave sensors. The plurality of slave sensors are configured to wirelessly send the environmental data to the one or more master sensors. Additionally or alternatively the plurality of slave sensors are configured to wirelessly send the industrial process data to the one or more master sensors. The one or more master sensors are configured to send the environmental data to at least one of the one or more servers over a wireless network 50. Additionally or alternatively the one or more master sensors are configured to send the industrial process data to the at least one of the one or more servers over the wireless network.

In an example, the plurality of slave sensors are configured to wirelessly send the environmental data and/or industrial process data to the one or more master sensors based on the associated configurations of the plurality of slave sensors.

In an example, the one or more servers comprises one or more cloud instances 60. The one or more cloud instances are configured to store the environmental data and/or are configured to store the industrial process data.

In an example, the one or more servers comprises one or more edge gateways 70.

In an example, the one or more edge gateways are configured to receive the environmental data and/or are configured to receive the industrial process data. The one or more edge gateways are configured to pre-process the environmental data and/or are configured to pre-process the industrial process data. The one or more edge gateways are configured to send the pre-processed environmental data to the one or more cloud instances for storage and/or are configured to send the pre-processed industrial process data to the one or more cloud instances for storage.

In an example, the one or more master sensors are configured to register the plurality of slave sensors prior to receiving the environmental data from the plurality of slave sensors. Additionally or alternatively the one or more master sensors are configured to register the plurality of slave sensors prior to receiving the industrial process data from the plurality of slave sensors.

In an example, registration is based on information transmitted from the one or more cloud instances.

In an example, the one or more edge gateways are configured to register the one or more master sensors prior to receiving the environmental from the one or more master sensors. Additionally or alternatively the one or more edge gateways are configured to register the one or more master sensors prior to receiving the industrial process data from the one or more master sensors.

In an example, registration is based on information transmitted from the one or more cloud instances.

In an example, the wireless network comprises a cellular or mobile network.

In an example, the wireless network comprises a LTE and/or 5G network.

In an example, the plurality of slave sensors and the one or more master sensors are configured to communicate with each other utilizing one or more of Wi-Fi, Bluetooth, BLE, VLC, infrared radiation.

In an example, the one or more master sensors are configured to register a slave sensor prior to receiving the environmental and/or industrial process data from that slave sensor.

In an example, the one or more master sensors are configured to register the plurality of slave sensors prior to receiving the environmental data from the plurality of slave sensors. Additionally or alternatively the one or more master sensors are configured to register the plurality of slave sensors prior to receiving the industrial process data from the plurality of slave sensors.

In an example, a master sensor is configured to re-configure a slave sensor based on the environmental data received from that slave sensor. Additionally or alternatively a master sensor is configured to re-configure a slave sensor based on industrial process data received from that slave sensor.

In an example, the one or more master sensors are configured to re-configure the plurality of slave sensors based on the environmental data received from associated slave sensors. Additionally or alternatively the one or more master sensors are configured to re-configure the plurality of slave sensors based on the industrial process data received from associated slave sensors.

In an example, the one or more master sensors are configured to temporarily store the environmental data and/or temporarily store the industrial process data.

In an example, one or more of the plurality of slave sensors are configured to temporarily store the environmental data and/or the industrial process data.

In an example, the one or more master sensors are configured to pre-process the environmental data and/or industrial process data.

In an example, one or more of the plurality of slave sensors are configured to pre-process the environmental data and/or industrial process data.

In an example, the plurality of slave sensors are configured to indicate to the one or more master sensors their associated temporal availability based on the associated configurations of the plurality of slave sensors. Additionally or alternatively the plurality of slave sensors are configured to indicate to the one or more master sensors their associated temporal unavailability based on the associated configurations of the plurality of slave sensors.

From the above it is clear that a sensing method with the sensing system can be operated.

In an example of a sensing method with a sensor system, the sensor system comprises: one or more master sensors; a plurality of slave sensors; and one or more servers. The method comprises:

wirelessly sending data from the one or more master sensors to the plurality of slave sensors;

acquiring environmental data and/or industrial process data by the plurality of slave sensors based on associated configurations of the plurality of slave sensors;

wirelessly sending the environmental data and/or industrial process data from the plurality of slave sensors to the one or more master sensors; and sending the environmental data and/or industrial process data from the one or more master sensor to at least one of the one or more servers over a wireless network.

In an example, the method comprises sending the environmental data and/or industrial process data from the plurality of slave sensors to the one or more master sensors based on the associated configurations of the plurality of slave sensors.

In an example, the one or more servers comprises one or more cloud instances configured to store the environmental data and/or industrial process data.

In an example, the one or more servers comprises one or more edge gateways.

In an example, the method comprises receiving by the one or more edge gateways the environmental data and/or industrial process and pre-processing the environmental data and/or industrial process data by the one or more edge gateways and sending the pre-processed environmental data and/or industrial process data from the one or more edge gateways to the one or more cloud instances for storage.

In an example, the method comprises registering by the one or more master sensors the plurality of slave sensors prior to receiving the environmental data and/or industrial process data from the plurality of slave sensors.

In an example, the registering is based on information transmitted from the one or more cloud instances.

In an example, the method comprises registering by the one or more edge gateways the one or more master sensors prior to receiving the environmental data and/or industrial process data from the one or more master sensors.

In an example, the registering is based on information transmitted from the one or more cloud instances.

In an example, the wireless network comprises a cellular or mobile network.

In an example, the wireless network comprises a LTE and/or 5G network.

In an example, the plurality of slave sensors and the one or more master sensors are configured to communicate with each other utilizing one or more of Wi-Fi, Bluetooth, BLE, VLC, infrared radiation.

In an example, the method comprises registering by the one or more master sensors a slave sensor prior to receiving the environmental data and/or industrial process data from that slave sensor.

In an example, the method comprises re-configuring by a master sensor a slave sensor based on the environmental data and/or industrial process data received from that slave sensor.

In an example, the method comprises temporarily storing by the one or more master sensors and/or the one or more of the plurality of slave sensors the environmental data and/or industrial process data.

In an example, the method comprises pre-processing by the one or more master sensors and/or the one or more of the plurality of slave sensors the environmental data and/or industrial process data.

In an example, the method comprises indicating by the plurality of slave sensors to the one or more master sensors their associated temporal availability and/or their associated temporal unavailability based on the associated configurations of the plurality of slave sensors.

With the above described sensor system and associated method the challenges of integrating sensors into an industrial environment is solved through utilization of a wireless network such as that based LTE+/5G technologies, and applying for example an edge gateway and a cloud instance that provide the platform for common device/sensor handling, data processing facilities, and security services. Moreover, the differentiation between master sensor and slave sensors provides for increases flexibility with respect to the slave sensors according to their usage, e.g.: Slave sensors:— Low-cost slave sensor: Battery usage, BLE, cheap sensing technology regarding temperature—High-cost slave sensor: Energy-harvesting, best sensing technology focusing on radiance. —Special slave sensors: Utilizing VLC or other approaches for special applications in cases where a radio-based application cannot be applied. The concept enables flexibility by supporting homogeneity as well as heterogeneity of (slave) sensors, scalability to large scale of deployment, various communication technologies, different power supply approaches, etc. Moreover, it considers integrated security services to authenticate and register the slave sensors with the master/the master with edge gateway and cloud instance.

Continuing with FIG. 1, the following is a detailed description of various embodiments of the sensor system and associated method.

The system consists of:

One or more slave sensors that are connected to a master sensor via a wireless communication technology, such as Wi-Fi, Bluetooth, BLE, VLC, infrared etc.

One or more master sensors that is/are connected to a set of slave sensors via a wireless communication technology, such as Wi-Fi, Bluetooth, BLE, VLC, infrared etc. and that is connected over a cellular/mobile network to an edge gateway or to a cloud instance.

One or more optional edge gateways that is/are connected to a set of master sensors over a cellular/mobile network and is/are connected to a cloud instance over a cellular/mobile network.

A cloud instance that is connected over a cellular/mobile network and that finally stores the data and can perform analytical investigation on that data as well.

The slave sensors can be added to the system in an ad hoc manner and register with the master sensor. Here, two types of sensors can be differentiated: Pluggable/static slave sensors are attached to an item at a specific location for a dedicated period of time, while mobile slave sensors are assigned to a mobile device, such as mobile phone, smart phone or watch etc. Both types of sensor devices can be used to sense the data during a specific time period or until a special event/alarm occurs.

The registration process can be done using various techniques, as described for example in:

P. T. Eugster, P. A. Felber, R. Guerraoui, and A.-M. Kermarrec. The Many Faces of Publish/Subscribe. ACM Computing Surveys, 35(2):114-131, June 2003;

Gamma, E., Helm, R., Johnson, R., and Vlissides, J.: Design Patterns, Elements of Reusable, Object-Oriented Software. Addison-Wesley, Reading, MA, 1995; and Pärssinen, J., Koponen, T., Eronen, P. (2004). Pattern Language for Service Discovery. Proceedings of 9th European Conference on Pattern Languages of Programs (EuroPLoP 2004), Irsee, Germany.

The slave sensors sense the environment and/or industrial processes and collect data. The collected data is stored temporarily on the sensor. In case of mobile sensors this data can be preprocessed and shown to the user. The collected data is sent to the master sensor depending on the current configuration of the slave sensor that is periodically, at predefined point in time, based on an event or alert etc. The configuration rules may affect the communication behavior of the slave sensor depending on its power supply (using batteries, energy harvesting, or being connected to a power line). In case of power supply limitation, the slave sensor keeps sensing and collecting data but reduces the communication effort by temporarily disabling the connectivity for a dedicated period of time. The temporal unavailability of a slave sensor can be done by utilizing the leasing concept or other techniques. Utilizing the leasing concept, the slave sensor sends a lease to the master sensor that includes a creation and expiration time of the lease that represents the availability of the sensor. More details on the leasing concept can be found for example in:

Jain, P. and Kircher, M. (2000). Leasing. Proceedings of $7^{th}$ Patterns Languages of Programs Conference (PLoP 2000), Allerton Park, Monticello, Illinois, USA.

A master sensor connects or is being connected to a set of slave sensors via a wireless communication technology, such as Wi-Fi, Bluetooth, BLE, Visual Light Communication (VLC), infrared etc. and is connected over a cellular/mobile network to an edge gateway or to a cloud instance. It can always be on and be connected (as long as there are no connection breakdowns or similar breakdowns according to missing power supply). It utilizes integrated security services provided by the cloud—either directly or via the edge gateway—to authenticate and register the slave sensors. Afterwards, it receives slave sensor data and stores it temporarily. Moreover, it can be used to preprocess the received sensor data according to the application needs before it is sent to an edge gateway or a cloud instance.

An edge gateway can be used to collect the data from the master sensor or multiple master sensors and store it. The storage might occur temporarily to enable preprocessing of the data before sending it to the cloud instance or for a longer period of time to run time critical-analytics applications directly on the edge gateway and directly to use the results to improve the status of the process or plant. It utilizes integrated security services provided by the cloud to authenticate and register the slave sensors with the master and the master with the edge gateway.

Finally, a cloud instance stores the received data. The data can be used to perform analytical investigation. It provides integrated security services to authenticate and register the slave sensors with the master and the master with the edge gateway.

The configuration of each slave/master sensor as well as of the edge gateway can be done automatically or manually based on the data provided by the level below, e.g. slave sensor data is collected by the master sensor. The master sensor changes the configuration of the slave sensor should it figured out that the current sensing can be improved or an anomaly has been detected that requires more accurate investigation.

Mobile/cellular technologies address domains that were exclusively provided by our communication technologies in the past. These challenges are solved considering LTE+/5G technologies and applying an edge gateway and a cloud instance that provide the platform for common device handling, data processing facilities, and security services. Moreover, the differentiation between master and slave sensors helps increasing flexibility according to the latter usage, e.g.:

Slave sensors:

Low-cost slave sensor: Battery usage, BLE, cheap sensing technology regarding temperature High-cost slave sensor: Energy-harvesting, best sensing technology focusing on radiance.

Special slave sensors: Utilizing VLC for special applications in cases where radio-based application cannot be applied.

The new development enables flexibility by supporting homogeneity as well as heterogeneity of (slave) sensors, scalability to large scale of deployment, various communication technologies, different power supply approaches, etc. Moreover, it considers integrated security services to authenticate and register the slave sensors with the master/ the master with edge gateway and cloud instance.

From the above, it is clear that one or more computer programs, comprising machine-readable instructions can be provided which when executed on one or more computers cause the one or more computers to perform the above described method.

Also, from the above it is clear that a non-transitory computer storage medium, and/or a download product, can comprises the one or more computer programs.

One or more computers can then operate with the one or more computer programs.

One or more computers can then comprise the non-transitory computer storage medium and/or the download product.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A sensor system, comprising:
   one or more master sensors;
   a plurality of slave sensors; and
   one or more servers,
   wherein the one or more master sensors are configured to wirelessly send data to the plurality of slave sensors,
   wherein the plurality of slave sensors are configured to acquire environmental and/or industrial process data based on associated configurations of the plurality of slave sensors,
   wherein the plurality of slave sensors are configured to wirelessly send the environmental and/or industrial process data to the one or more master sensors based on the associated configurations of the plurality of slave sensors,
   wherein the one or more master sensors are configured to send the environmental and/or industrial process data to at least one of the one or more servers over a wireless network; and
   wherein the one or more servers comprise one or more cloud instances configured to store the environmental and/or industrial process data, wherein the one or more servers comprise one or more edge gateways, and wherein the one or more edge gateways are configured to receive the environmental and/or industrial process data and pre-process the environmental and/or industrial process data and send the pre-processed environmental and/or industrial process data to the one or more cloud instances for storage.

2. The sensor system of claim 1, wherein the one or more master sensors are configured to register the plurality of slave sensors prior to receiving the environmental and/or industrial process data from the plurality of slave sensors.

3. The sensor system of claim 1, wherein the one or more edge gateways are configured to register the one or more master sensors prior to receiving the environmental and/or industrial process data from the one or more master sensors.

4. The sensor system of claim 3, wherein registration is based on information transmitted from the one or more cloud instances.

5. The sensor system of claim 1, wherein the wireless network comprises a cellular or mobile network.

6. The sensor system of claim 1, wherein the wireless network comprises a LTE and/or 5G network.

7. The sensor system of claim 1, wherein the plurality of slave sensors and the one or more master sensors are configured to communicate with each other utilizing one or more of Wi-Fi, Bluetooth, BLE, VLC, or infrared radiation.

8. The sensor system of claim 1, wherein the one or more master sensors are configured to register a slave sensor of the plurality of slave sensors prior to receiving the environmental and/or industrial process data from the slave sensor.

9. The sensor system of claim 1, wherein a master sensor of the one or more master sensors is configured to re-configure a slave sensor of the plurality of slave sensors based on the environmental and/or industrial process data received from the slave sensor.

10. The sensor system of claim 1, wherein the one or more master sensors and/or one or more of the plurality of slave sensors are configured to temporarily store the environmental and/or industrial process data.

11. The sensor system of claim 1, wherein the one or more master sensors and/or one or more of the plurality of slave sensors are configured to pre-process the environmental and/or industrial process data.

12. The sensor system of claim 1, wherein the plurality of slave sensors are configured to indicate to the one or more master sensors associated temporal availability and/or associated temporal unavailability based on the associated configurations of the plurality of slave sensors.

13. A sensing method for a sensor system comprising one or more master sensors, a plurality of slave sensors, and one or more servers, the method comprising:
   wirelessly sending data from the one or more master sensors to the plurality of slave sensors;
   acquiring environmental and/or industrial process data by the plurality of slave sensors based on associated configurations of the plurality of slave sensors;
   wirelessly sending the environmental and/or industrial process data from the plurality of slave sensors to the one or more master sensors based on the associated configurations of the plurality of slave sensors; and
   sending the environmental and/or industrial process data from the one or more master sensors to at least one of the one or more servers over a wireless network;
   wherein the one or more servers comprise one or more cloud instances configured to store the environmental and/or industrial process data, wherein the one or more servers comprise one or more edge gateways; and
   wherein the method further comprises:
      receiving, by the one or more edge gateways, the environmental and/or industrial process data,
      pre-processing the environmental and/or industrial process data by the one or more edge gateways, and
      sending the pre-processed environmental and/or industrial process data from the one or more edge gateways to the one or more cloud instances for storage.

14. A non-transitory computer storage medium comprising machine-readable instructions that, when executed by one or more computers, cause the one or more computers to perform the method of claim 13.

15. A computer, comprising:
   the non-transitory computer storage medium of claim 14.

16. A sensor system, comprising:
   one or more master sensors;
   a plurality of slave sensors; and
   one or more servers,
   wherein the one or more master sensors are configured to wirelessly send data to the plurality of slave sensors, wherein the plurality of slave sensors are configured to acquire environmental and/or industrial process data based on associated configurations of the plurality of slave sensors, wherein the plurality of slave sensors are configured to wirelessly send the environmental and/or industrial process data to the one or more master sensors, and wherein the one or more master sensors are configured to send the environmental and/or industrial process data to at least one of the one or more servers over a wireless network, wherein the one or more servers comprises one or more edge gateways configured to register the one or more master sensors prior to receiving the environmental and/or industrial process data from the one or more master sensors.

17. The sensor system of claim 16, wherein the plurality of slave sensors are configured to wirelessly send the environmental and/or industrial process data to the one or more master sensors based on the associated configurations of the plurality of slave sensors.

18. The sensor system of claim 17, wherein the one or more servers comprises one or more cloud instances configured to store the environmental and/or industrial process data.

19. The sensor system of claim 16, wherein the one or more master sensors are configured to register the plurality of slave sensors prior to receiving the environmental and/or industrial process data from the plurality of slave sensors.

20. The sensor system of claim 16, wherein registration is based on information transmitted from the one or more cloud instances.

21. The sensor system of claim 16, wherein the one or more master sensors are configured to register a slave sensor of the plurality of slave sensors prior to receiving the environmental and/or industrial process data from the slave sensor.

* * * * *